(12) United States Patent
Weyerhaeuser et al.

(10) Patent No.: US 9,465,835 B2
(45) Date of Patent: Oct. 11, 2016

(54) COLUMNWISE SPATIAL AGGREGATION (75) Inventors: Christoph Weyerhaeuser, Heidelberg (DE); Tobias Mindnich, Walldorf (DE); Daniel Baeumges, Viersen (DE); Gerrit Simon Kazmaier, Heidelberg (DE)

(73) Assignee: SAP SE, Walldorf (DE)

( * ) Notice: Subject to any disclaimer, the term of this patent is extended or adjusted under 35 U.S.C. 154(b) by 538 days.

(21) Appl. No.: 13/532,646

(22) Filed: Jun. 25, 2012

(65) Prior Publication Data
US 2013/0346418 A1    Dec. 26, 2013

(51) Int. Cl.
*G06F 7/00*      (2006.01)
*G06F 17/30*     (2006.01)

(52) U.S. Cl.
CPC ... *G06F 17/30412* (2013.01); *G06F 17/30241* (2013.01)

(58) Field of Classification Search
None
See application file for complete search history.

(56) References Cited

U.S. PATENT DOCUMENTS

| | | | |
|---|---|---|---|
| 6,226,014 B1 * | 5/2001 | Kang | G06T 11/40 345/441 |
| 6,950,828 B2 | 9/2005 | Shaw et al. | |
| 7,024,414 B2 | 4/2006 | Sah et al. | |
| 7,626,496 B1 * | 12/2009 | Asher | H02G 1/00 340/286.01 |
| 8,090,745 B2 | 1/2012 | Hayashi et al. | |
| 8,204,313 B2 | 6/2012 | Wheeler et al. | |
| 8,694,508 B2 | 4/2014 | Weyerhaeuser et al. | |
| 2003/0097356 A1 * | 5/2003 | Lee | G06F 17/30592 |
| 2003/0208503 A1 | 11/2003 | Roccaforte | |
| 2003/0212650 A1 * | 11/2003 | Adler | G06F 17/30259 |
| 2004/0193566 A1 * | 9/2004 | Kothuri | 707/1 |
| 2005/0203932 A1 * | 9/2005 | Kothuri et al. | 707/100 |
| 2006/0265422 A1 * | 11/2006 | Ando | G06F 17/30241 |
| 2006/0287984 A1 * | 12/2006 | Chen | G06F 17/30463 |
| 2007/0112714 A1 | 5/2007 | Fairweather | |
| 2007/0288196 A1 | 12/2007 | Frank et al. | |
| 2008/0059889 A1 * | 3/2008 | Parker et al. | 715/748 |
| 2009/0060345 A1 | 3/2009 | Wheeler et al. | |
| 2009/0070293 A1 * | 3/2009 | Vechersky | G06F 17/30241 |
| 2009/0227269 A1 | 9/2009 | Frank et al. | |
| 2009/0251472 A1 | 10/2009 | Antoine | |
| 2009/0319556 A1 | 12/2009 | Stolte et al. | |
| 2010/0010347 A1 * | 1/2010 | Friedman | A61B 8/08 600/443 |
| 2010/0100539 A1 | 4/2010 | Davis et al. | |
| 2010/0114905 A1 * | 5/2010 | Slavik et al. | 707/743 |

(Continued)

OTHER PUBLICATIONS

Gomez, Leticia et al. "Spatial aggregation: Data model and implementation." *Information Systems*. Pergamon Press. Oxford, GB. vol. 34. No. 6. (Sep. 1, 2009). pp. 551-576.

(Continued)

*Primary Examiner* — Debbie Le
*Assistant Examiner* — Hasanul Mobin
(74) *Attorney, Agent, or Firm* — Mintz Levin Cohn Ferris Glovsky and Popeo, P.C.

(57) ABSTRACT

A spatial aggregation query of a database is processed by receiving data specifying a maximum bounded rectangle for point data responsive to the query and specifying one or more grid partitions of the maximum bounded rectangle (in which at least one of the partitions is partially aggregated. Thereafter, for each partition, a number of points responsive to the query in each partition and a center of gravity of the points in each partition is computed. Data characterizing the corresponding computed number of points and center of gravity is then provided (e.g., persisted, loaded, transmitted, displayed, etc.). Related apparatus, systems, techniques and articles are also described.

18 Claims, 4 Drawing Sheets

(56) References Cited

U.S. PATENT DOCUMENTS

| | | |
|---|---|---|
| 2010/0114941 A1 | 5/2010 | Von Kaenel et al. |
| 2010/0205181 A1 | 8/2010 | Chidlovskii |
| 2010/0281011 A1 | 11/2010 | Santi et al. |
| 2010/0318929 A1 | 12/2010 | Hilton et al. |
| 2010/0332210 A1 | 12/2010 | Birdwell et al. |
| 2010/0332468 A1 | 12/2010 | Cantrell |
| 2011/0161328 A1 | 6/2011 | Park et al. |
| 2011/0202539 A1 | 8/2011 | Salemann |
| 2011/0264667 A1 | 10/2011 | Harizopoulos et al. |
| 2011/0276592 A1 | 11/2011 | Gautama et al. |
| 2012/0054195 A1 | 3/2012 | Hu et al. |
| 2012/0191723 A1 | 7/2012 | Salemann |
| 2014/0222828 A1 | 8/2014 | Weyerhaeuser et al. |

OTHER PUBLICATIONS

Lee et al. "Materialized In-Network View for spatial aggregation queries in wireless sensor network." *ISPRS Journal of Photogrammetry and Remote Sensing*. Amsterdam [U.A.]: Elsevier, Amsterdam, NL. vol. 62. No. 5. (Oct. 13, 2007). pp. 382-402.

Pedersen, Torben Bach and Tryfona, Nektaria. "Pre-aggregation in Spatial Data Warehouses." *Field Programmable Logic and Application*. (Jan. 1, 2001). Springer. Berlin, Heidelberg. SSTD 2001. LNCS vol. 2121. pp. 460-478. 2001.

\* cited by examiner

COLUMNWISE SPATIAL AGGREGATION

TECHNICAL FIELD

The current subject matter is directed columnwise spatial aggregation of data in a data source such as a column oriented database.

BACKGROUND

Spatial aggregation is a key functionality of spatial analysis of geographic data that allows users to start spatial analysis from an overview perspective and then narrow down to areas of interest. In order to enable navigation of such geographic data, it is necessary to aggregate geometries to a coarse grain level (i.e., a high level) in order to provide an overview to the user.

For example, a controller of a sales pipeline may want to find out in which region of the world a product is most frequently sold. Therefore, the controller, using a data exploration software application, starts on a world-wide perspective and display the sales of the product for each country. When she identifies an important area, she narrows down to this specific area for deeper analysis at a level that is higher than a most fine-grained level. In addition, the controller may want to compare different performance metrics such as sales of a particular product across each store within a particular city. Such data traversal can be processor intensive and/or require extended periods of time—thereby hampering overall performance.

SUMMARY

In one aspect, a spatial aggregation query of a database is processed by receiving data specifying a maximum bounded rectangle for point data responsive to the query and specifying one or more grid partitions of the maximum bounded rectangle (in which at least one of the partitions is partially aggregated. Thereafter, for each partition, a number of points responsive to the query in each partition and a center of gravity of the points in each partition is computed. Data characterizing the corresponding computed number of points and center of gravity is then provided (e.g., persisted, loaded, transmitted, displayed, etc.).

The data specifying the maximum bounded rectangle can include four coordinates corresponding to four corners of the maximum bounded rectangle. The data characterizing the corresponding computed number of points and the center of gravity can be computed in parallel for two or more partitions (i.e., the current subject matter provides a parallelized solution in some implementations). The database can be a columnwise database storing columnar data and in some cases it is an in-memory database.

Data specifying at least one key figure can be received so that aggregations of such key figure can be computed for each partition. The center of gravity can be computer for each partition by differently weighting one or more key figures of the points in each partition. A maximum bounded rectangle can also be computed for each partition (and data characterizing same can be provided).

Articles of manufacture (e.g., computer program products, etc.) are also described that comprise computer executable instructions permanently stored on non-transitory computer readable media, which, when executed by a computer, causes the computer to perform operations herein. Similarly, computer systems are also described that may include a processor and a memory coupled to the processor. The memory may temporarily or permanently store one or more programs that cause the processor to perform one or more of the operations described herein. In addition, operations specified by methods can be implemented by one or more data processors either within a single computing system or distributed among two or more computing systems.

The subject matter described herein provides many advantages. For example, the current subject matter enables a spatial aggregation that leverages a column store data layout and combines fast scan performance on compressed data with the aggregation on geometries. Such an arrangement provides more rapid responses while, at the same time, consuming fewer processing resources.

The details of one or more variations of the subject matter described herein are set forth in the accompanying drawings and the description below. Other features and advantages of the subject matter described herein will be apparent from the description and drawings, and from the claims.

DETAILED DESCRIPTION

Figure 1:
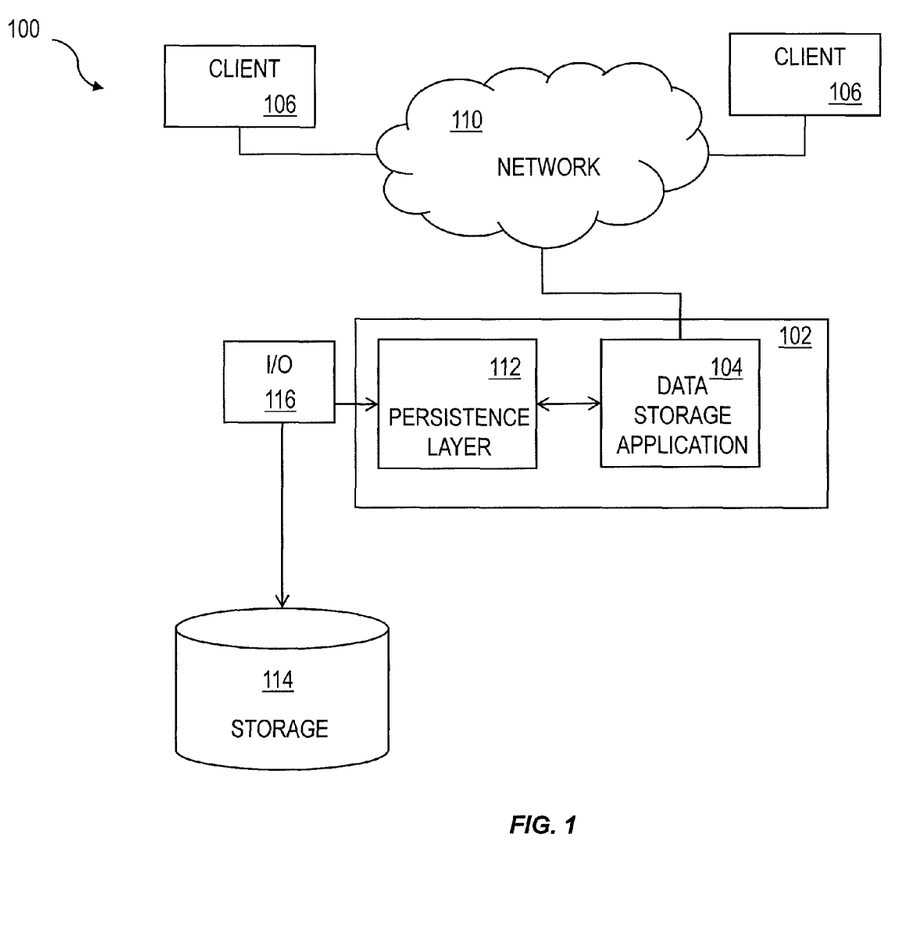
FIG. 1 is a diagram illustrating a system including a data storage application.

FIG. 1 shows an example of a system 100 in which a computing system 102, which can include one or more programmable processors that can be collocated, linked over one or more networks, etc., executes one or more modules, software components, or the like of a data storage application 104. The data storage application 104 can include one or more of a database, an enterprise resource program, a distributed storage system (e.g. NetApp Filer available from NetApp of Sunnyvale, Calif.), or the like.

The one or more modules, software components, or the like can be accessible to local users of the computing system 102 as well as to remote users accessing the computing system 102 from one or more client machines 106 over a network connection 110. One or more user interface screens produced by the one or more first modules can be displayed to a user, either via a local display or via a display associated with one of the client machines 106. Data units of the data storage application 104 can be transiently stored in a persistence layer 112 (e.g. a page buffer or other type of temporary persistency layer), which can write the data, in the form of storage pages, to one or more storages 114, for example via an input/output component 116. The one or more storages 114 can include one or more physical storage media or devices (e.g. hard disk drives, persistent flash memory, random access memory, optical media, magnetic media, and the like) configured for writing data for longer term storage. It should be noted that the storage 114 and the input/output component 116 can be included in the computing system 102 despite their being shown as external to the computing system 102 in FIG. 1.

Data retained at the longer term storage 114 can be organized in pages, each of which has allocated to it a defined amount of storage space. In some implementations, the amount of storage space allocated to each page can be constant and fixed. However, other implementations in which the amount of storage space allocated to each page can vary are also within the scope of the current subject matter.

Figure 2:
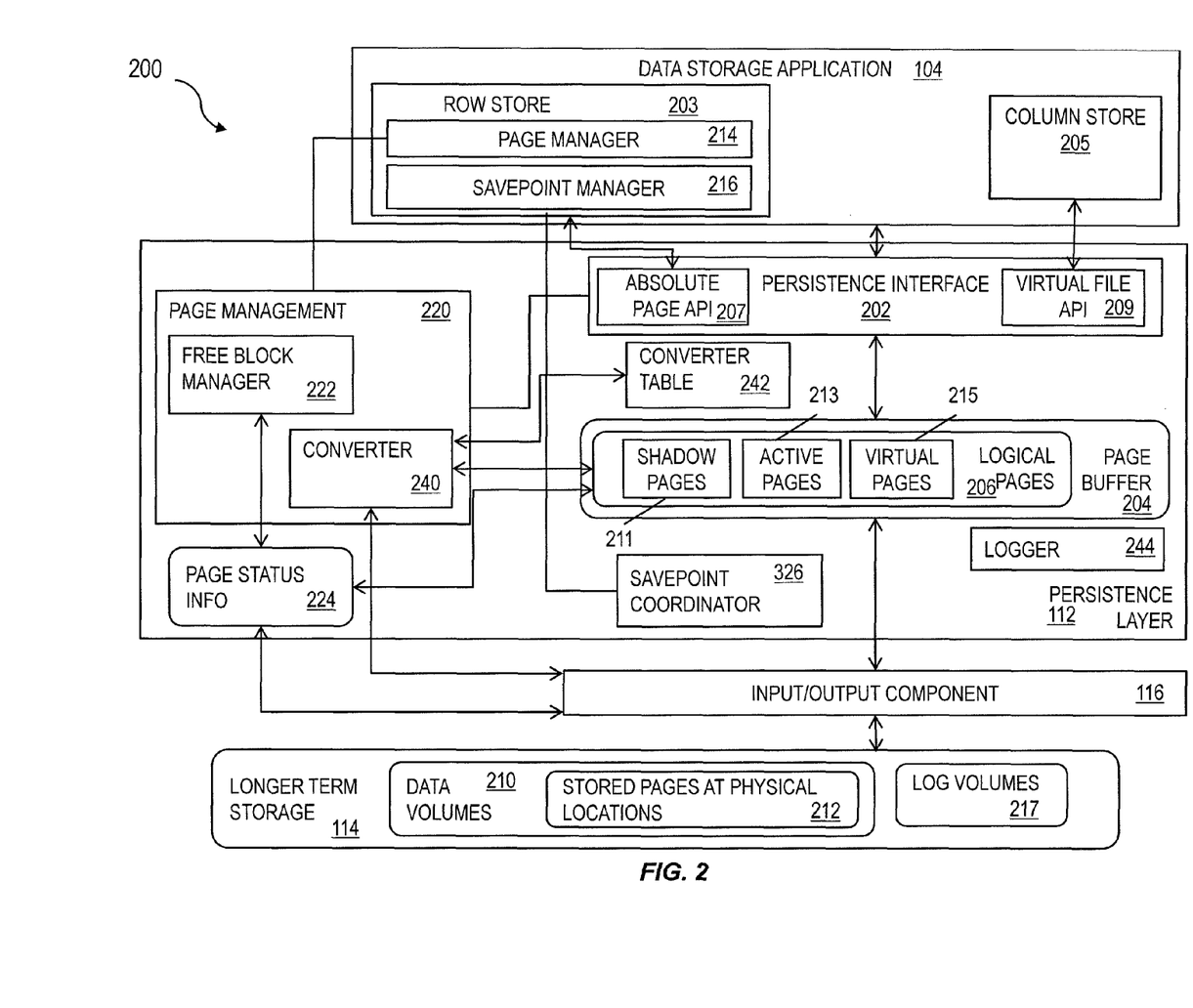
FIG. 2 is a diagram illustrating a software architecture including a data storage application.

FIG. 2 shows a software architecture 200 consistent with one or more features of the current subject matter. A data storage application 104, which can be implemented in one or more of hardware and software, can include one or more of a database application, a network-attached storage system, or the like. According to at least some implementations of the current subject matter, such a data storage application 104 can include or otherwise interface with a persistence layer 112 or other type of memory buffer, for example via a persistence interface 202. A page buffer 204 within the persistence layer 112 can store one or more logical pages 206, and optionally can include shadow pages 211, active pages 213, data pages of virtual files 215 (i.e., a data objects acting like a file) and the like. The logical pages 206 retained in the persistence layer 112 can be written to a storage (e.g. a longer term storage, etc.) 114 via an input/output component 116, which can be a software module, a sub-system implemented in one or more of software and hardware, or the like. The storage 114 can include one or more data volumes 210 where stored pages 212 are allocated at physical memory blocks.

In some implementations, the data storage application 104 can include a row store 203 and a column store 205. The row store 203 can comprise or be otherwise in communication with a page manager 214 and/or a savepoint manager 216. The page manager 214 can communicate with a page management module 220 at the persistence layer 112 that can include a free block manager 222 that monitors page status information 224, for example the status of physical pages within the storage 114 and logical pages in the persistence layer 112 (and optionally in the page buffer 204). The savepoint manager 216 can communicate with a savepoint coordinator 226 at the persistence layer 204 to handle savepoints, which are used to create a consistent persistent state of the database for restart after a possible crash. The row store 203 can access the persistence interface 202 via an absolute page API 207. The column store 205 which can store columns in contiguous memory can access the persistence interface 202 via a virtual file API 209.

In some implementations of a data storage application 104, the page management module of the persistence layer 112 can implement shadow paging. The free block manager 222 within the page management module 220 can maintain the status of physical pages. The page buffer 204 can included a fixed page status buffer that operates as discussed herein. A converter component 240, which can be part of or in communication with the page management module 220, can be responsible for mapping between logical and physical pages written to the storage 114. The converter 240 can maintain the current mapping of logical pages to the corresponding physical pages in a converter table 242. The converter 240 can maintain a current mapping of logical pages 206 to the corresponding physical pages in one or more converter tables 242. When a logical page 206 is read from storage 114, the storage page to be loaded can be looked up from the one or more converter tables 242 using the converter 240. When a logical page is written to storage 114 the first time after a savepoint, a new free physical page is assigned to the logical page. The free block manager 222 marks the new physical page as "used" and the new mapping is stored in the one or more converter tables 242.

The persistence layer 112 can ensure that changes made in the data storage application 104 are durable and that the data storage application 104 can be restored to a most recent committed state after a restart. Writing data to the storage 114 need not be synchronized with the end of the writing transaction. As such, uncommitted changes can be written to disk and committed changes may not yet be written to disk when a writing transaction is finished. After a system crash, changes made by transactions that were not finished can be rolled back. Changes occurring by already committed transactions should not be lost in this process. A logger component 244 can also be included to store the changes made to the data of the data storage application in a linear log. The logger component 244 can be used during recovery to replay operations since a last savepoint to ensure that all operations are applied to the data and that transactions with a logged "commit" record are committed before rolling back still-open transactions at the end of a recovery process.

With some data storage applications, writing data to a disk is not necessarily synchronized with the end of the writing transaction. Situations can occur in which uncommitted changes are written to disk and while, at the same time, committed changes are not yet written to disk when the writing transaction is finished. After a system crash, changes made by transactions that were not finished must be rolled back and changes by committed transaction must not be lost.

To ensure that committed changes are not lost, redo log information can be written by the logger component 244 whenever a change is made. This information can be written to disk at latest when the transaction ends. The log entries can be persisted in separate log volumes 217 while normal data is written to data volumes 210. With a redo log, committed changes can be restored even if the corresponding data pages were not written to disk. For undoing uncommitted changes, the persistence layer 112 can use a combination of undo log entries (from one or more logs) and shadow paging.

The persistence interface 202 can handle read and write requests of stores (e.g., in-memory stores, etc.). The persistence interface 202 can also provide write methods for writing data both with logging and without logging. If the logged write operations are used, the persistence interface 202 invokes the logger 244. In addition, the logger 244 provides an interface that allows stores (e.g., in-memory stores, etc.) to directly add log entries into a log queue. The logger interface also provides methods to request that log entries in the in-memory log queue are flushed to disk.

Log entries contain a log sequence number, the type of the log entry and the identifier of the transaction. Depending on the operation type additional information is logged by the logger 244. For an entry of type "update", for example, this would be the identification of the affected record and the after image of the modified data.

When the data application 104 is restarted, the log entries need to be processed. To speed up this process the redo log is not always processed from the beginning Instead, as stated above, savepoints can be periodically performed that write all changes to disk that were made (e.g., in memory, etc.) since the last savepoint. When starting up the system, only the logs created after the last savepoint need to be processed. After the next backup operation the old log entries before the savepoint position can be removed.

When the logger 244 is invoked for writing log entries, it does not immediately write to disk. Instead it can put the log entries into a log queue in memory. The entries in the log queue can be written to disk at the latest when the corresponding transaction is finished (committed or aborted). To guarantee that the committed changes are not lost, the commit operation is not successfully finished before the corresponding log entries are flushed to disk. Writing log queue entries to disk can also be triggered by other events, for example when log queue pages are full or when a savepoint is performed.

The column store 205 can persist its tables to virtual files provided by the persistence layer 112 via the virtual file API 207. Internally the persistence layer 112 can map a virtual file to a chain of linked pages 215 stored in the page buffer 204. Data belonging to one columnar table can be stored in multiple virtual files: one virtual file per column for a main storage and one virtual file for a delta log. In addition, one virtual file can optionally be stored per column for the main storage of the history part of the table, and/or one virtual file can optionally be stored per table for the delta of the history part of the table. The persistence layer 112 can maintain a directory that stores for each virtual file the start page and additional information such as the size and the type of the virtual file.

Figure 3:
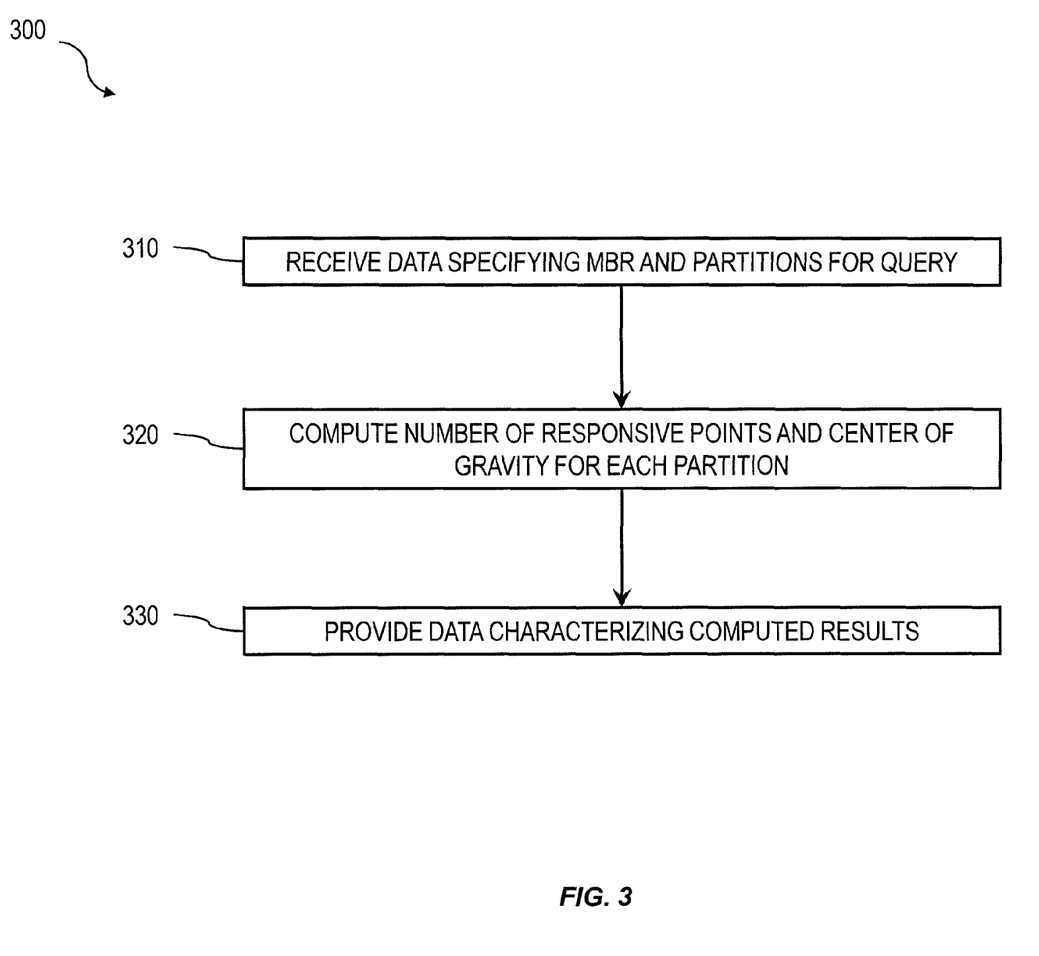
FIG. 3 is a process flow diagram illustrating a method for spatial aggregation.

FIG. 3 process flow diagram illustrating a method 300 for processing a spatial aggregation query of a database. Data is received, at 310, that specifies a maximum bounded rectangle for point data responsive to the query and specifies one or more grid partitions of the maximum bounded rectangle. In some cases, at least one of the partitions can be partially aggregated. Thereafter, at 320, for each partition, a number of points responsive to the query in each partition and a center of gravity of the points in each partition are computed. Subsequently, at 330, data characterizing the corresponding computed number of points and the center of gravity is provided (e.g., transmitted, persisted, loaded, displayed, etc.).

As stated above, to issue a spatial aggregation, a user/consumer defines an area as a maximum bounding rectangle (MBR). The MBR can be aggregated and additionally, a grid (see 400A of the diagram 400 of FIG. 4) defining a plurality of partitions can be provided that defines which areas within the MBR will be partly aggregated. The spatial aggregation returns the number of points in each part of the grid, the MBR of each grid, the center of gravity for each grid (see 400B of FIG. 4) and additional key figures aggregated along the grid.

Figure 4:
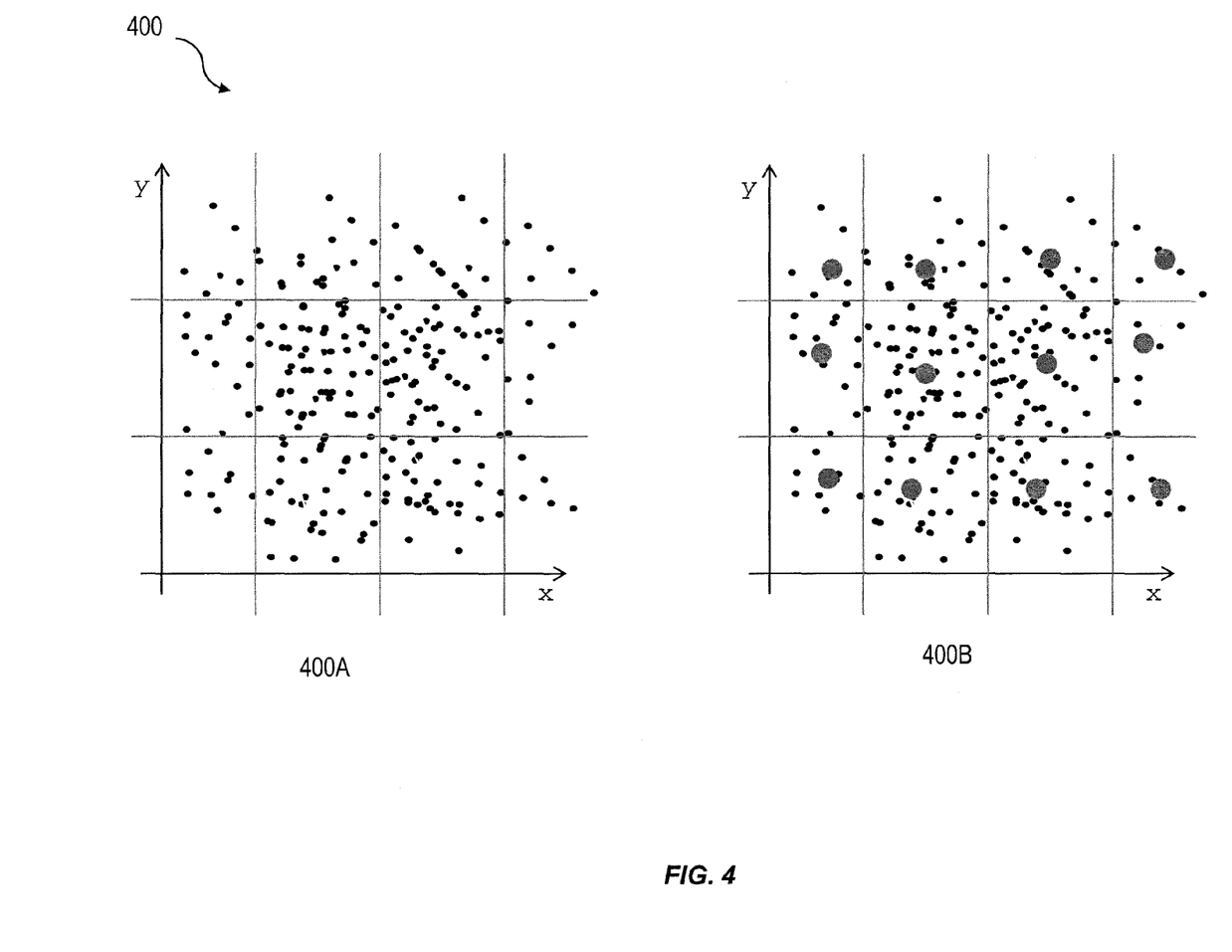
FIG. 4 are diagrams illustrating spatially aggregated data.

In addition to counting the points contained in a grid, the points themselves must be aggregated, because the aggregated result needs to be associated to a map display (see FIG. 4). This is done by computing the gravity center of all points (a graphical representation of same is illustrated in 400B). The center of gravity can be influenced by giving certain points and/or attributes of points an additional weight factor such as turnover, amount due etc. Next, a bit vector for the points per grid cell can be returned to aggregate additional key figures; the spatial reference acts as a grouping criteria for other key figures.

The spatial aggregation can be embedded into a calculation engine, such as the calculation engine described in U.S. Pat. No. 8,195,643, the contents of which are hereby fully incorporated by reference. In order to perform a spatial aggregation query, a user can define a calculation model that contains of a calculation node with a pre-defined operation (e.g., GeometryDS, etc.) and provide the parameters (e.g., MBR, number of partitions, partition size, etc.) for a spatial aggregation.

The MBR of the spatial aggregation can be defined by four parameters LL_X, LL_Y, UR_X and UR_Y. The parameters define the lower left point (LL_X, LL_Y) and the upper right (UR_X, UR_Y) point of an rectangle. In addition, to the MBR, granularity of the grid needs to be defined (e.g., by a user, etc.). Such granularity can be defined by specifying two parameters. A first parameter can define the number of partitions on the x-axis and a second parameter defines the number of partitions on the y-axis. With the example of FIG. 4, the number of partitions on the x-axis is three and the number of partitions on the y-axis is two.

The execution of the spatial aggregation can be done in three phases in order to harness parallel execution for the computational expensive spatial aggregation. In the first phase, a window-query can be issued on the window that covers all points. In the second phase the individual cells must be computed, this is done by spawning multiple threads which are given a definition of the grid and a distinct part of the result of the first window-query. Each thread works on its piece of data and assigns every point to the respective cell by storing the x,y values in the cell and increments the cells' point counter. In the final phase, the results of all threads can be accumulated in a final grid and the center of gravity can be computed. This can either be done trivially by the arithmetic mean of all points in a cell or by applying an additional weighting factor to the points.

The current subject matter can utilize a window query such as one defined in U.S. patent application Ser. No. 13/488,143, filed Jun. 4, 2012 entitled "Columnwise Storage of Point Data", the contents of which are hereby fully incorporated by reference. For spatial aggregation, the window query can be parallelized for the execution of each partition in the grid and can start the aggregation on compressed data. The parallelization enables a more complete utilization of processing resources (e.g., CPUs, etc.) and work on compressed data reduces the memory consumption, which in turn enables the possibility to do a data driven parallelization.

Aspects of the subject matter described herein can be embodied in systems, apparatus, methods, and/or articles depending on the desired configuration. In particular, various implementations of the subject matter described herein can be realized in digital electronic circuitry, integrated circuitry, specially designed application specific integrated circuits (ASICs), computer hardware, firmware, software, and/or combinations thereof. These various implementations can include implementation in one or more computer programs that are executable and/or interpretable on a programmable system including at least one programmable processor, which can be special or general purpose, coupled to receive data and instructions from, and to transmit data and instructions to, a storage system, at least one input device, and at least one output device.

These computer programs, which can also be referred to programs, software, software applications, applications, components, or code, include machine instructions for a programmable processor, and can be implemented in a high-level procedural and/or object-oriented programming language, and/or in assembly/machine language. As used herein, the term "machine-readable medium" refers to any computer program product, apparatus and/or device, such as for example magnetic discs, optical disks, memory, and Programmable Logic Devices (PLDs), used to provide machine instructions and/or data to a programmable processor, including a machine-readable medium that receives machine instructions as a machine-readable signal. The term "machine-readable signal" refers to any signal used to provide machine instructions and/or data to a programmable processor. The machine-readable medium can store such machine instructions non-transitorily, such as for example as would a non-transient solid state memory or a magnetic hard drive or any equivalent storage medium. The machine-readable medium can alternatively or additionally store such machine instructions in a transient manner, such as for example as would a processor cache or other random access memory associated with one or more physical processor cores.

To provide for interaction with a user, the subject matter described herein can be implemented on a computer having a display device, such as for example a cathode ray tube (CRT) or a liquid crystal display (LCD) monitor for displaying information to the user and a keyboard and a pointing device, such as for example a mouse or a trackball, by which the user may provide input to the computer. Other kinds of devices can be used to provide for interaction with a user as well. For example, feedback provided to the user can be any form of sensory feedback, such as for example visual feedback, auditory feedback, or tactile feedback; and input from the user may be received in any form, including, but not limited to, acoustic, speech, or tactile input. Other possible input devices include, but are not limited to, touch screens or other touch-sensitive devices such as single or multi-point resistive or capacitive trackpads, voice recognition hardware and software, optical scanners, optical pointers, digital image capture devices and associated interpretation software, and the like.

The subject matter described herein can be implemented in a computing system that includes a back-end component, such as for example one or more data servers, or that includes a middleware component, such as for example one or more application servers, or that includes a front-end component, such as for example one or more client computers having a graphical user interface or a Web browser through which a user can interact with an implementation of the subject matter described herein, or any combination of such back-end, middleware, or front-end components. A client and server are generally, but not exclusively, remote from each other and typically interact through a communication network, although the components of the system can be interconnected by any form or medium of digital data communication. Examples of communication networks include, but are not limited to, a local area network ("LAN"), a wide area network ("WAN"), and the Internet. The relationship of client and server arises by virtue of computer programs running on the respective computers and having a client-server relationship to each other.

The implementations set forth in the foregoing description do not represent all implementations consistent with the subject matter described herein. Instead, they are merely some examples consistent with aspects related to the described subject matter. Although a few variations have been described in detail herein, other modifications or additions are possible. In particular, further features and/or variations can be provided in addition to those set forth herein. For example, the implementations described above can be directed to various combinations and sub-combinations of the disclosed features and/or combinations and sub-combinations of one or more features further to those disclosed herein. In addition, the logic flows depicted in the accompanying figures and/or described herein do not necessarily require the particular order shown, or sequential order, to achieve desirable results. The scope of the following claims may include other implementations or embodiments.

What is claimed is:

1. A method for processing a spatial aggregation query of a database comprising:
   receiving first data comprising (i) a maximum bounded rectangle for point data responsive to the query, (ii) one or more grid partitions of the maximum bounded rectangle, and (iii) one or more key figures, the point data including geographical information about a plurality of data points, the maximum bounded rectangle defining a geographical area which includes at least a portion of the plurality of data points, the one or more grid partitions defining areas within the maximum bounded rectangle that can be at least partially aggregated, and the one or more key figures defining information about the plurality of points, the information comprising values unrelated to the geographical information;
   computing, for each grid partition, a quantity of grid points responsive to the query;
   computing, for each grid partition, a center of gravity of the grid points, the center of gravity computed by weighting the grid points based on at least one of the one or more key figures; and
   providing, for at least one partition, second data characterizing the corresponding computed quantity of points and the center of gravity.

2. A method as in claim 1, wherein the received first data further comprises four coordinates corresponding to four corners of the maximum bounded rectangle.

3. A method as in claim 1, wherein the second data is computed in parallel for two or more grid partitions.

4. A method as in claim 1, wherein the database is a columnwise database storing columnar data.

5. A method as in claim 4, wherein the database is an in-memory database.

6. A method as in claim 1, further comprising:
   computing, for each of the one or more grid partitions, aggregations of the one or more key figures.

7. A method as in claim 1, further comprising:
   computing, for each of the one or more grid partitions, a maximum bounded rectangle; and
   providing third data characterizing the maximum bounded rectangle computed for each of the one or more grid partitions.

8. A method as in claim 1, wherein the receiving, computing, and providing are implemented by at least one data processor of at least one computing system.

9. A method as in claim 1, wherein the providing second data comprises one or more of:
   persisting the second data, loading the second data, transmitting the second data, and displaying the second data.

10. A non-transitory computer-readable medium storing instructions, when executed by a processor, cause operations comprising:
    receiving first data comprising (i) a maximum bounded rectangle for point data responsive to the query, (ii) one or more grid partitions of the maximum bounded rectangle, and (iii) one or more key figures, the point data including geographical information about a plurality of data points, the maximum bounded rectangle defining a geographical area which includes at least a portion of the plurality of data points, the one or more grid partitions defining areas within the maximum bounded rectangle that can be at least partially aggregated, and the one or more key figures defining information about the plurality of points, the information comprising values unrelated to the geographical information;
    computing, for each grid partition, a quantity of grid points responsive to the query;
    computing, for each grid partition, a center of gravity of the grid points, the center of gravity computed by weighting the grid points based on at least one of the one or more key figures; and providing for at least one partition, second data characterizing the corresponding computed quantity of points and the center of gravity.

11. A non-transitory computer-readable medium as in claim 10, wherein the received first data further comprises four coordinates corresponding to four corners of the maximum bounded rectangle.

12. A non-transitory computer-readable medium as in claim 10, wherein the second data is computed in parallel for two or more grid partitions.

13. A non-transitory computer-readable medium as in claim 10, wherein the database is a columnwise database storing columnar data.

14. A non-transitory computer-readable medium as in claim 13, wherein the database is an in-memory database.

15. A non-transitory computer-readable medium as in claim 10, wherein the operations further comprise:
   computing, for each of the one or more grid partitions, aggregations of the one or more key figures.

16. A non-transitory computer-readable medium as in claim 10, wherein the operations further comprise:
   computing, for each of the one or more grid partitions, a maximum bounded rectangle; and
   providing third data characterizing the maximum bounded rectangle computed for each of the one or more grid partitions.

17. A non-transitory computer-readable medium as in claim 10, wherein the providing second data comprises one or more of:
   persisting the second data, loading the second data, transmitting the second data, and displaying the second data.

18. A system for processing a spatial aggregation query of a database comprising:
   one or more data processors;
   memory storing instructions, which when executed by at least one data processor, result in operations comprising:
      receiving data comprising (i) a maximum bounded rectangle for point data responsive to the query, (ii) one or more grid partitions of the maximum bounded rectangle, and (iii) one or more key figures, the point data including geographical information about a plurality of data points, the maximum bounded rectangle defining a geographical area which includes at least a portion of the plurality of data points, the one or more grid partitions defining areas within the maximum bounded rectangle that can be at least partially aggregated, and the one or more key figures defining information about the plurality of points, the information comprising values unrelated to the geographical information;
      computing, for each grid partition, a quantity of grid points responsive to the query;
      computing, for each grid partition, a center of gravity of the grid points, the center of gravity computed by weighting the grid points based on at least one of the one or more key figures; and
      providing, for at least one partition, data characterizing the corresponding computed quantity of points and the center of gravity.

\* \* \* \* \*